(12) United States Patent
Dong et al.

(10) Patent No.: US 11,153,278 B2
(45) Date of Patent: Oct. 19, 2021

(54) METHOD AND DEVICE FOR INFORMATION INTERACTION

(71) Applicant: BEIJING XIAOMI MOBILE SOFTWARE CO., LTD., Beijing (CN)

(72) Inventors: Junjie Dong, Beijing (CN); Shun Chen, Beijing (CN); Hongguang Dong, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 327 days.

(21) Appl. No.: 16/352,461

(22) Filed: Mar. 13, 2019

(65) Prior Publication Data

US 2019/0306122 A1    Oct. 3, 2019

(30) Foreign Application Priority Data

Mar. 28, 2018   (CN) .......................... 201810264876.5

(51) Int. Cl.
   *H04L 29/06*    (2006.01)
   *H04L 29/12*    (2006.01)
   *H04L 12/54*    (2013.01)

(52) U.S. Cl.
   CPC .......... *H04L 63/0263* (2013.01); *H04L 12/56* (2013.01); *H04L 61/1511* (2013.01);
   (Continued)

(58) Field of Classification Search
   CPC . H04L 63/0263; H04L 61/1511; H04L 12/56; H04L 61/2514; H04L 61/256;
   (Continued)

(56) References Cited

U.S. PATENT DOCUMENTS 6,182,073 B1 * 1/2001 Kukkal ............... H04N 21/4622
9,712,486 B2 * 7/2017 Johnson .................... G06F 8/60
(Continued)

FOREIGN PATENT DOCUMENTS

CN    103391306 A    11/2013
CN    106210176 A    12/2016
(Continued)

OTHER PUBLICATIONS

Extended European Search Report dated Jul. 24, 2019 in EP 19165717.0.
(Continued)

*Primary Examiner* — Eleni A Shiferaw
*Assistant Examiner* — Hassan A Hussein
(74) *Attorney, Agent, or Firm* — Syncoda LLC; Feng Ma

(57) ABSTRACT

A method for information interaction includes: when an access request sent by a webpage to a preset domain name is received by a browser component, resolving the preset domain name into a designated access address, the access request being sent by the webpage when the webpage is required to interact with an operating system of a terminal, and the designated access address being an access address that has not been occupied; sending the access request to the designated access address as a destination address; and when a firewall detects that the destination address of the access request is the designated access address, redirecting the access request to a local web service, the local web service being configured for information interaction with the operating system of the terminal.

16 Claims, 5 Drawing Sheets

(52) U.S. Cl.
CPC ........ *H04L 61/256* (2013.01); *H04L 61/2514* (2013.01); *H04L 63/029* (2013.01); *H04L 63/0236* (2013.01)

(58) Field of Classification Search
CPC ... H04L 63/0236; H04L 63/029; H04L 63/02; H04L 63/0227; H04L 67/02; H04L 67/16
See application file for complete search history.

(56) References Cited

U.S. PATENT DOCUMENTS

| | | | | |
|---|---|---|---|---|
| 10,134,212 | B1* | 11/2018 | Ren | G07C 9/00896 |
| 10,629,014 | B1* | 4/2020 | Ren | H04L 12/2829 |
| 2004/0003290 | A1* | 1/2004 | Malcolm | H04L 63/029 |
| | | | | 726/14 |
| 2007/0033569 | A1* | 2/2007 | Davidson | G06F 16/9574 |
| | | | | 717/103 |
| 2007/0113269 | A1* | 5/2007 | Zhang | H04W 12/069 |
| | | | | 726/4 |
| 2008/0270626 | A1* | 10/2008 | Takeda | H04L 67/104 |
| | | | | 709/238 |
| 2009/0248804 | A1* | 10/2009 | Ohtani | H04L 67/2866 |
| | | | | 709/204 |
| 2011/0078309 | A1* | 3/2011 | Bloch | H04L 63/0236 |
| | | | | 709/224 |
| 2013/0332584 | A1* | 12/2013 | Sun | H04L 67/1004 |
| | | | | 709/219 |
| 2015/0262235 | A1 | 9/2015 | Neal et al. | |
| 2017/0213032 | A1* | 7/2017 | Zhang | H04L 29/06 |
| 2017/0222978 | A1* | 8/2017 | Cathrow | H04L 67/42 |
| 2017/0371967 | A1 | 12/2017 | Pieper | |
| 2018/0058876 | A1* | 3/2018 | Xie | G01C 21/3644 |
| 2018/0324632 | A1* | 11/2018 | Cho | H04W 28/02 |
| 2019/0311017 | A1* | 10/2019 | Dong | G06F 16/9574 |

FOREIGN PATENT DOCUMENTS

| | | | | |
|---|---|---|---|---|
| CN | 106789882 A | | 5/2017 | |
| CN | 109587102 A | * | 4/2019 | |
| EP | 3211863 A1 | | 8/2017 | |
| WO | WO-2005101217 A1 | * | 10/2005 | ......... H04L 63/0227 |
| WO | WO-2016062077 A1 | * | 4/2016 | ......... H04L 67/2814 |

OTHER PUBLICATIONS

Anoop Macharla: "How is a website rendered from a networking perspective?!", Sep. 27, 2017.
Anonymous: "Network address translation—Wikipedia", Mar. 24, 2018.
Anonymous: "NAT traversal—Wikipedia", Mar. 25, 2018.
CN First Office Action in Application No. 201810264876.5, dated Aug. 20, 2020.

* cited by examiner

METHOD AND DEVICE FOR INFORMATION INTERACTION

CROSS-REFERENCE TO RELATED APPLICATION

This application claims priority to Chinese patent application No. 201810264876.5, filed on Mar. 28, 2018, the disclosure of which is hereby incorporated by reference in its entirety.

BACKGROUND

With the development of the Internet, webpages carry more and more functions. For some functions, the webpage is required to be interactive with the operating system of the terminal, for example, starting a camera of the terminal.

SUMMARY

The present disclosure relates to the technical field of networks, and in particular, to a method and a device for information interaction.

In an aspect, there is provided a method for information interaction, including:

when an access request sent by a webpage to a preset domain name is received by a browser component, resolving the preset domain name into a designated access address, the access request being sent by the webpage when the webpage is required to interact with an operating system of a terminal, and the designated access address being an access address that has not been occupied;

sending the access request to the designated access address as a destination address;

when a firewall detects that the destination address of the access request is the designated access address, redirecting the access request to a local web service, the local web service being configured for information interaction with the operating system of the terminal; and based on the information interaction between the local web service and the operating system of the terminal, responding to the access request and returning a response message.

In some embodiments, resolving the preset domain name into the designated access address includes:

invoking a domain name resolution interface of the operating system of the terminal by the browser component, the domain name resolution interface having a domain name filtering function; and resolving the preset domain name into the designated access address based on the domain name filtering function.

In some embodiments, redirecting the access request to the local web service of the operating system of the terminal includes:

converting the destination address of the access request into a local IP address and a local port number according to an address filtering rule of the firewall, the local IP address and the local port number pointing to the local webpage service; and forwarding the access request with the converted destination address to the local webpage service.

In some embodiments, after responding to the access request and returning a response message, the method further includes: when the firewall detects that a source address of the response message is a local IP address and a local port number, redirecting the response message to the webpage; and both of the local IP address and the local port number point to the local web service.

In some embodiments, redirecting the response message to the webpage includes:

changing the source address of the response message to the designated access address according to an address filtering rule of the firewall; and forwarding the response message with the changed source address to the webpage.

In another aspect, there is provided a method for information interaction, which is applied in a browser component. The method includes:

when receiving an access request sent by a webpage to a preset domain name, resolving the preset domain name into a designated access address, the access request being sent by the webpage when the webpage is required to interact with an operating system of a terminal, and the designated access address being an access address that has not been occupied; and sending the access request to the designated access address as a destination address, wherein the access request is subject to address filtering detection by a firewall, and the firewall is configured to: when the firewall detects that the destination address of the access request is the designated access address, redirect the access request to a local web service for information interaction with the operating system of the terminal, respond to the access request and return a response message.

In some embodiments, resolving the preset domain name into the designated access address includes:

invoking a domain name resolution interface of the operating system of the terminal, the domain name resolution interface having a domain name filtering function; and resolving the preset domain name into the designated access address based on the domain name filtering function.

In another aspect, there is provided a device for information interaction, including:

a domain-name resolving module configured to, when an access request sent by a webpage to a preset domain name is received by a browser component, resolve the preset domain name into a designated access address, the access request being sent by the webpage when the webpage is required to interact with an operating system of a terminal, and the designated access address being an access address that has not been occupied;

a sending module configured to send the access request to the designated access address as the destination address;

a first redirecting module configured to, when a firewall detects that the destination address of the access request is the designated access address, redirect the access request to a local web service, the local web service being configured for information interaction with the operating system of the terminal; and a responding module configured to, based on the information interaction between the local web service and the operating system of the terminal, respond to the access request and return a response message.

In some embodiments, the domain-name resolving module is configured to invoke a domain name resolution interface of the operating system of the terminal by the browser component, the domain name resolution interface having a domain name filtering function; and resolve the preset domain name into the designated access address based on the domain name filtering function.

In some embodiments, the first redirecting module is configured to convert the destination address of the access request into a local IP address and a local port number according to an address filtering rule of the firewall, the local IP address and the local port number pointing to the local web service; and forward the access request with the converted destination address to the local web service.

In some embodiments, the device further includes:

a second redirecting module configured to, when firewall detects that a source address of the response message is a local IP address and a local port number, redirect the response message to the webpage;

wherein both of the local IP address and the local port number point to the local web service.

In some embodiments, the second redirecting module is configured to change the source address of the response message to the designated access address according to an address filtering rule of the firewall; and forward the response message with the changed source address to the webpage.

In another aspect, there is provided a device for information interaction, including:

a domain-name resolving module configured to, when receiving an access request sent by a webpage to a preset domain name, resolve the preset domain name into a designated access address, the access request being sent by the webpage when the webpage is required to interact with an operating system of a terminal, and the designated access address being an access address that has not been occupied; and a sending module configured to send the access request to the designated access address as the destination address, wherein the access request is subject to address filtering detection by a firewall, and the firewall is configured to: when the firewall detects that the destination address of the access request is the designated access address, redirect the access request to a local web service for information interaction with the operating system of the terminal, respond to the access request and return a response message.

In some embodiments, the domain-name resolving module is configured to invoke a domain name resolution interface of the operating system of the terminal, the domain name resolution interface having a domain name filtering function; and resolve the preset domain name into the designated access address based on the domain name filtering function.

In another aspect, there is provided a device for information interaction, including:

a processor; and a memory for storing instructions executable by the processor, wherein the processor is configured to: when an access request sent by a webpage to a preset domain name is received by a browser component, resolve the preset domain name into a designated access address, the access request being sent by the webpage when the webpage is required to interact with an operating system of a terminal, and the designated access address being an access address that has not been occupied; send the access request to the designated access address as the destination address; when a firewall detects that the destination address of the access request is the designated access address, redirect the access request to a local web service, the local web service being configured for information interaction with the operating system of the terminal; and based on the interaction between the local web service and the operating system of the terminal, respond to the access request and return a response message.

In another aspect, there is provided a device for information interaction, including:

a processor; and a memory for storing instructions executable by the processor, wherein the processor is configured to: when receiving an access request sent by a webpage to a preset domain name, resolve the preset domain name into a designated access address, the access request being sent by the webpage when the webpage is required to interact with an operating system of a terminal, and the designated access address being an access address that has not been occupied; and send the access request to the designated access address as the destination address, wherein the access request is subject to address filtering detection by a firewall, and the firewall is configured to: when the firewall detects that the destination address of the access request is the designated access address, redirect the access request to a local web service for information interaction with the operating system of the terminal, respond to the access request and return a response message.

In another aspect, a mobile terminal is provided including the device described above, and further including a microphone and a speaker.

In some embodiments, the mobile terminal is a mobile phone.

In some embodiments, the processor is a general-purpose processor, such as central processing unit (CPU) of the mobile phone, which is configured to not only realize the methods described above but also run programs or applications (Apps) on the mobile phone, such as browsing, gaming, video/textual/voice communications, etc.

In some other embodiments, the processor is an ASIC described above.

A non-transitory computer readable storage medium is provided, having stored thereon instructions that, when being executed by a processor, cause the processor to: when receiving an access request sent by a webpage to a preset domain name, resolving the preset domain name into a designated access address, the access request being sent by the webpage when the webpage is required to interact with an operating system of a terminal, and the designated access address being an access address that has not been occupied; and sending the access request with the designated access address as a destination address, wherein the access request is subject to address filtering detection by a firewall, and the firewall is configured to: when the firewall detects that the destination address of the access request is the designated access address, redirect the access request to a local web service for information interaction with the operating system of the terminal, respond to the access request and return a response message.

In some embodiments, the processor is further configured to: invoke a domain name resolution interface of the operating system of the terminal, the domain name resolution interface having a domain name filtering function; and resolve the preset domain name into the designated access address based on the domain name filtering function.

It should be understood that both the foregoing general description and the following detailed description are exemplary and explanatory only and are not restrictive of the disclosure.

BRIEF DESCRIPTION OF THE DRAWINGS

The accompanying drawings, which are incorporated in and constitute a part of the present disclosure, illustrate embodiments consistent with the disclosure and, together with the description, serve to explain the principles of the disclosure.

DETAILED DESCRIPTION

In order to make the objects, technical solutions and advantages of the present disclosure more apparent, the embodiments of the present disclosure will be further described in detail below with reference to the accompanying drawings.

Reference will now be made in detail to some embodiments, examples of which are illustrated in the accompanying drawings. The following description refers to the accompanying drawings in which the same numbers in different drawings represent the same or similar elements unless otherwise represented. The implementations set forth in the following description of some embodiments do not represent all implementations consistent with the disclosure. Instead, they are merely examples of apparatuses and methods consistent with aspects related to the disclosure as recited in the appended claims.

The inventors of the present application have recognized that in related art, the terminal accesses the webpage through a browser or software including a browser kernel. In order to ensure the security of the operating system of the terminal and the user privacy, the browser and the like create an independent execution environment for the webpage, so that the webpage is isolated from the system of the terminal. In the case of a generic browser, for example, the webpage and the operating system of the terminal can only interact through a preset interface of the browser. However, for functions involving system security and user account information, the generic browser does not have a corresponding preset interface and cannot implement the corresponding function. To implement the corresponding function, specific software with the corresponding preset interface has to be developed based on the browser kernel. Then, when the webpage is accessed through the specific software, the interaction between the webpage and the operating system of the terminal can be completed and the corresponding functions can be realized.

To overcome the problems in the related art, various embodiments of the present disclosure provide a method and a device for information interaction.

For example, when an access request sent by a webpage to a preset domain name is received, the preset domain name is resolved into a designated access address that has not been occupied. The access request with a destination address being the designated access address is redirected by a firewall to a local web service which may interact with the operating system of the terminal. Then, the interaction with the operating system of the terminal is performed by the local web service. Such information interaction process can avoid the limitation of the interaction function between the browser or the browser kernel and the operating system, enable interaction between the developed function of the webpage and the operation system through a generic browser or software based on the browser kernel, which can lower the developing cost and have a wide applicability.

Figure 1A:
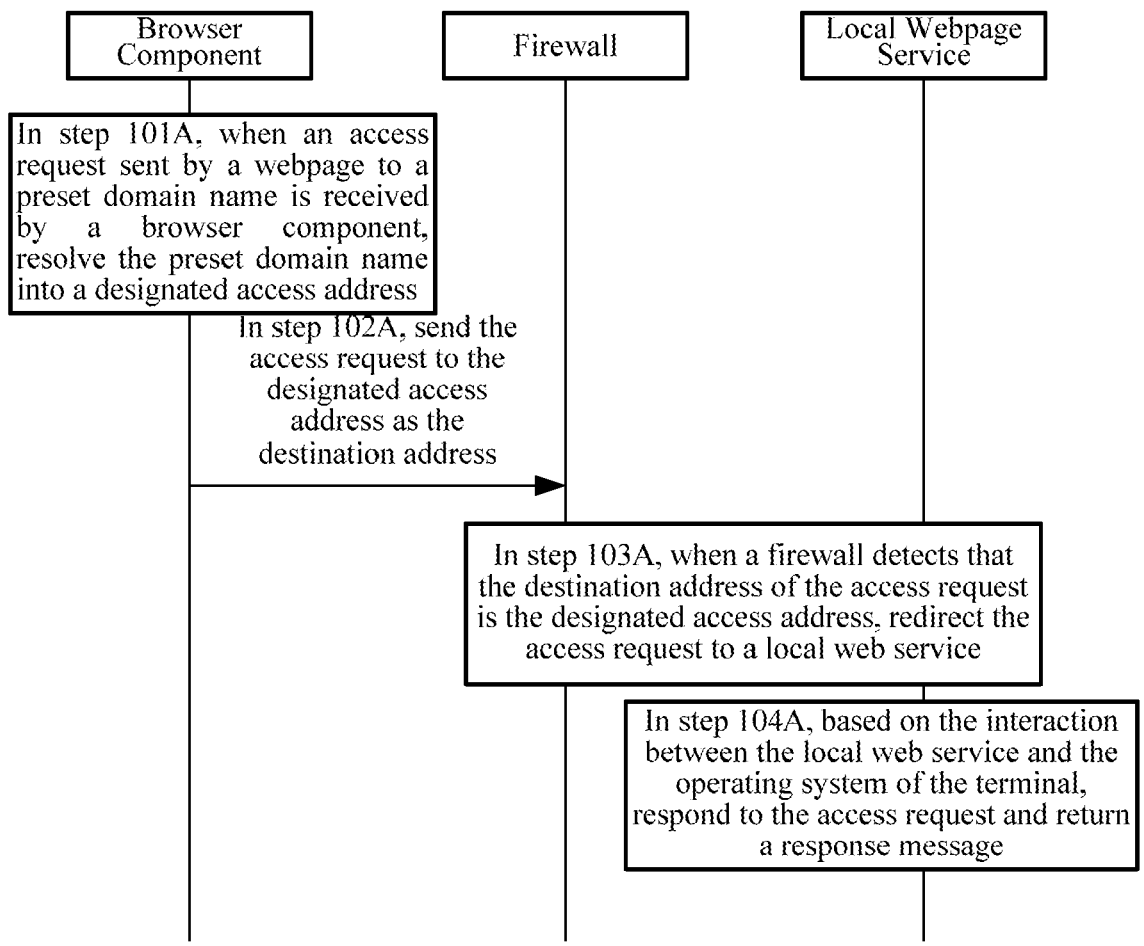
FIG. 1A is a flowchart of a method for information interaction according to some embodiments.

FIG. 1A is a flowchart of a method for information interaction according to some embodiments. As shown in FIG. 1A, the method is applied to a terminal, and includes the following steps.

In step 101A, when an access request sent by a webpage to a preset domain name is received by a browser component, the preset domain name is resolved into a designated access address.

The access request is sent by the webpage when it is required to interact with the operating system of the terminal, and the designated access address is an access address that has not been occupied.

In step 102A, the access request is sent to the designated access address as the destination address.

In step 103A, when a firewall detects that the destination address of the access request is the designated access address, the access request is redirected to a local web service which is configured for information interaction with the operating system of the terminal.

In step 104A, based on the interaction between the local web service and the operating system of the terminal, the access request is responded to and a response message is returned.

In the method provided by the embodiment of the present disclosure, when an access request sent by a webpage to a preset domain name is received, the preset domain name is resolved into a designated access address that has not been occupied. The access request with a destination address being the designated access address is redirected by a firewall to a local web service which may interact with the operating system of the terminal. Then, the interaction with the operating system of the terminal is performed by the local web service. Such information interaction process can avoid the limitation of the interaction function between the browser or the browser kernel and the operating system, enable interaction between the developed function of the webpage and the operation system through a generic browser or software based on the browser kernel, which can lower the developing cost and have a wide applicability.

In some embodiments, resolving the preset domain name into a designated access address includes the following steps.

A domain name resolution interface of the operating system of the terminal is invoked by the browser component, and the domain name resolution interface has a domain name filtering function; and the preset domain name is resolved into the designated access address based on the domain name filtering function.

In some embodiments, redirecting the access request to a local web service of the operating system of the terminal includes the following steps.

The destination address of the access request is converted into a local IP address and a local port number according to an address filtering rule of the firewall, and both of the local IP address and the local port number point to the local webpage service; and the access request with the converted destination address is forwarded to the local webpage service.

In some embodiments, after the access request is responded to and a response message is returned, the method further includes the following steps.

When it is detected by the firewall that a source address of the response message is the local IP address and the local port number, the response message is redirected to the webpage; and both of the local IP address and the local port number point to the local web service.

In some embodiments, redirecting the response message to the webpage includes:

the source address of the response message is changed to the designated access address according to the address filtering rule of the firewall; and the response message with the changed source address is forwarded to the webpage.

All of the above optional technical solutions may be combined to form an optional embodiment of the present disclosure, and will not be further described one by one herein.

Figure 1B:
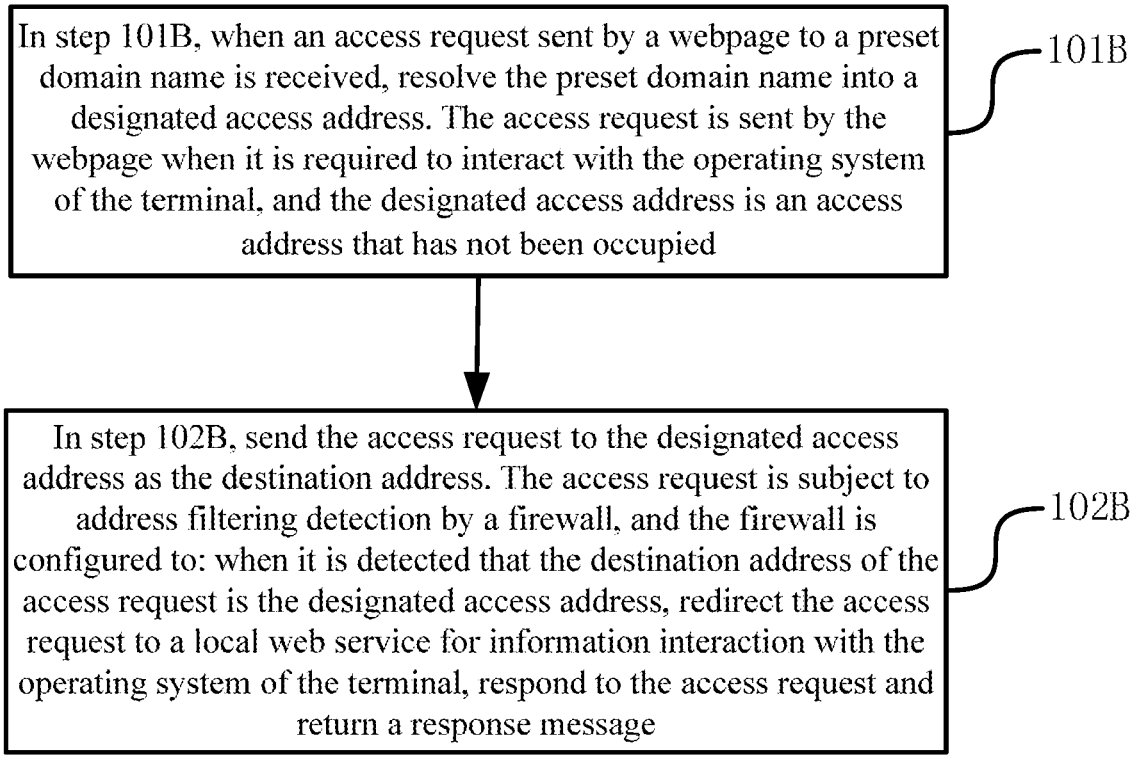
FIG. 1B is a flowchart of a method for information interaction according to some embodiments.

FIG. 1B is a flowchart of a method for information interaction according to some embodiments. As shown in FIG. 1B, the method is applied to a browser component, and includes the following steps.

In step 101B, when an access request sent by a webpage to a preset domain name is received, the preset domain name is resolved into a designated access address. The access request is sent by the webpage when it is required to interact with the operating system of the terminal, and the designated access address is an access address that has not been occupied.

In step 102B, the access request is sent to the designated access address as the destination address. The access request is subject to address filtering detection by a firewall, and the firewall is configured to: when it is detected that the destination address of the access request is the designated access address, redirect the access request to a local web service for information interaction with the operating system of the terminal, respond to the access request and return a response message.

In the method provided by the embodiment of the present disclosure, when an access request sent by a webpage to a preset domain name is received, the preset domain name is resolved into a designated access address that has not been occupied. The designated access address may be redirected by a firewall to a local web service that may interact with the operating system of the terminal. Then, the interaction with the operating system of the terminal is performed by the local web service, and a response message is returned. Such information interaction process can avoid the limitation of the interaction function between the browser or the browser kernel and the operating system, enable interaction between the developed function of the webpage and the operation system through a generic browser or software based on the browser kernel, which can lower the developing cost and have a wide applicability.

In some embodiments, resolving the preset domain name into a designated access address includes: invoking a domain name resolution interface of the operating system of the terminal, the domain name resolution interface having a domain name filtering function; and resolving the preset domain name into the designated access address based on the domain name filtering function.

All of the above optional technical solutions may be combined to form an optional embodiment of the present disclosure, and will not be further described one by one herein.

Figure 2:
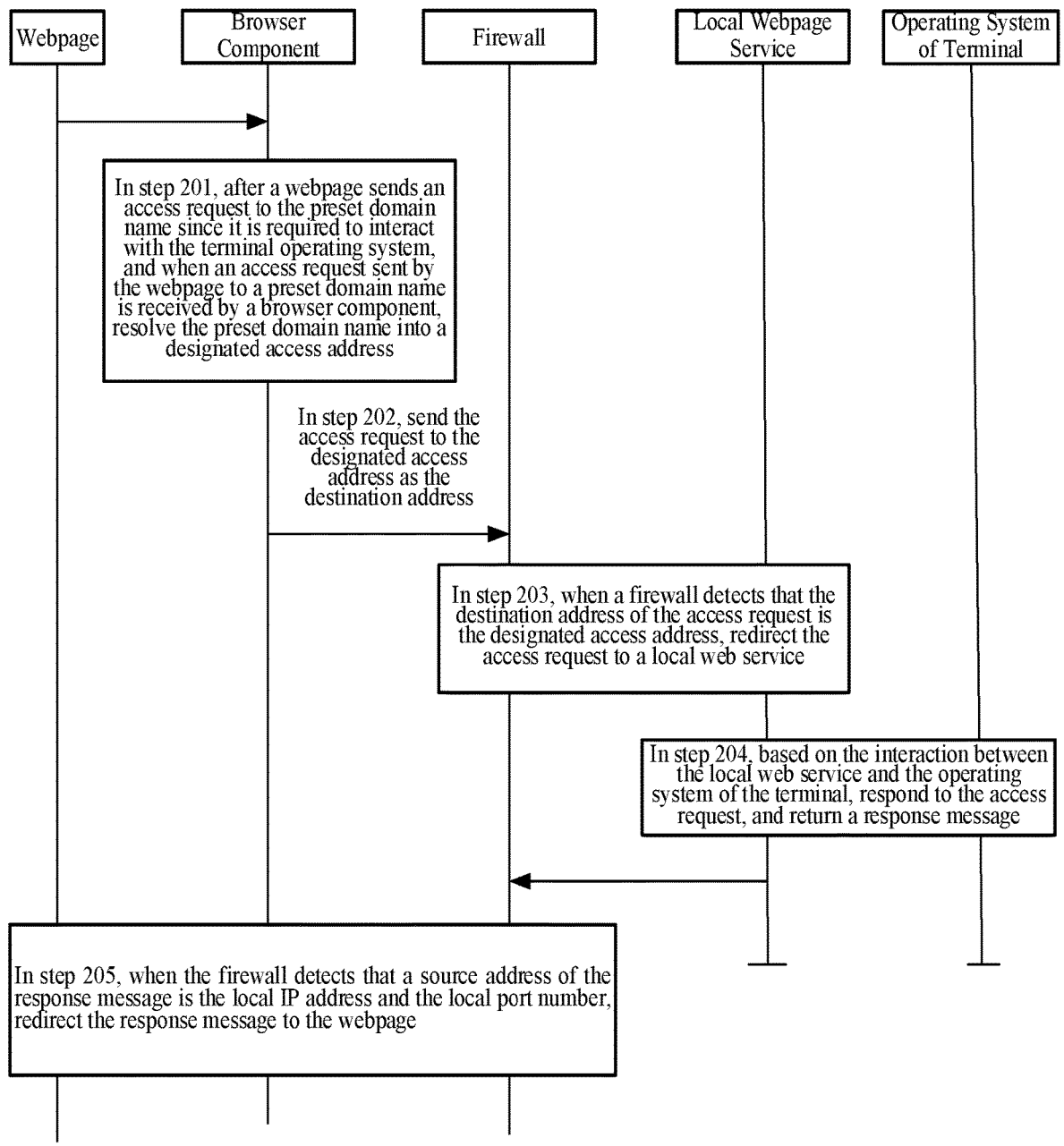
FIG. 2 is a flowchart of a method for information interaction according to an exemplary embodiment.

FIG. 2 is a flowchart of a method for information interaction according to some embodiments. As shown in FIG. 2, the method is applied in a terminal, and includes the following steps.

In step 201, after a webpage sends an access request to the preset domain name since it is required to interact with the terminal operating system, and when an access request sent by the webpage to a preset domain name is received by a browser component, the preset domain name is resolved into a designated access address.

In some embodiments, the preset domain name is a special domain name registered previously. The preset domain name does not point to any webpage. Since the preset domain name is registered, it is generally not occupied. For example, the preset domain name may be "abcdefghijk.com," which is not limited by the embodiment of the present disclosure.

In some embodiments, when a webpage function is developed, for a function of the webpage that requires interaction with the operating system of the terminal, an access request triggered by the function is directed to the preset domain name. That is, when the webpage is required to interact with the operating system of the terminal, an access request pointing to the preset domain name is sent. That is, for any access request sent to the preset domain name, the terminal determines it as an access request that requires interaction with the operating system.

The designated access address may be preset or modified by the system of the terminal. In the actual application process, the designated access address may not actually exist, and it may be understood that the designated access address is not occupied by any service, application or machine. The designated access address may be an IP (Internet Protocol) address, or a combination of an IP address and a port number. For example, the IP address may be preset to 1.2.4.3 or 255.0.0.0 and the like, which may not be occupied generally or may be an illegal IP address. The port number may be any port number that does not conflict with other services, such as 80, 8080, etc. When the designated access address is a combination of an IP address and a port number, the designated access address may be 1.2.4.3: 80, for example, which is not limited in the embodiment.

In some embodiments, when the terminal triggers an access request in a webpage, the terminal sends the access request through a script js, and the access request is processed by a browser component of the terminal. For example, the browser component resolves the preset domain name carried by the access request.

It should be noted that the browser component in this embodiment is configured to implement a browsing function for the webpage, and the browser component may be included in a generic browser, or may be included in software having a browser kernel, which is not limited in the embodiment of the present disclosure.

In an embodiment of the present disclosure, the process of resolving the preset domain name into the designated access address includes: invoking a domain name resolution interface of the operating system of the terminal by the browser component, the domain name resolution interface having a domain name filtering function; and resolving the preset domain name into the designated access address based on the domain name filtering function.

A preset domain name filtering module is provided additionally in the domain name resolution program of the operating system of the terminal, and the preset domain name filtering module is configured to convert the preset domain name into the designated access address. The browser component executes the domain name resolution program of the operating system of the terminal by invoking the domain name resolution interface. In an implementation, the preset domain name filtering module stores a correspondence between the preset domain name and the designated access address. When the domain name resolution program is executed, the preset domain name filtering module acquires the designated access address corresponding to the preset domain name according to the above correspondence, and returns the designated access address to the browser component.

Taking the browser component included in the browser as an example, in the process of displaying the webpage through the browser, when the webpage triggers an access request that requires interaction with the operating system of the terminal, the webpage sends the access request to the preset domain name abcdefghijk.com through the script js. The browser performs domain name resolution on all access requests sent by the webpage. When the browser detects that the domain name of the access request is the preset domain name abcdefghijk.com, the browser invokes the domain name resolution interface of the operating system of the terminal to resolve the preset domain name into the designated access address 1.2.4.3 and return the designated access address 1.2.4.3 as a return value to the browser.

In step 202, the access request is sent to the designated access address as the destination address.

When the browser component acquires the designated access address, the access request is forwarded to the designated access address as the destination address. That is, the destination address of the access request is the designated access address. The detailed process of sending the access request is: acquiring an IP data packet corresponding to the access request, setting the destination address of the IP data packet to the designated access address; and sending the IP data packet based on the set destination address.

Taking the browser component included in the browser as an example, when the browser acquires the designated access address as 1.2.4.3, the IP data packet is sent after the destination address of the IP data packet of the access request is set to 1.2.4.3.

In step 203, when a firewall detects that the destination address of the access request is the designated access address, the access request is redirected to a local web service.

In some embodiments, the process of redirecting the access request to a local webpage service includes: converting the destination address of the access request to a local IP address and a local port number according to an address filtering rule of the firewall; and forwarding the access request with the converted destination address to the local webpage service.

Both of the local IP address and the local port number point to the local web service. That is, the local web service may be accessed through the local IP address and the local port number.

The local web service is configured to perform information interaction with the operating system of the terminal. The local web service may also be regarded as an HTTP (HyperText Transfer Protocol) server established by the terminal on the local IP and the local port.

The terminal is provided with a firewall, and access requests issued by the webpage are all passed through the firewall. The firewall is configured to forward or intercept the data according to the destination address of the received IP data packet. The firewall is configured with an address filtering rule for the designated access address. For example, the address filtering rule may be: converting the destination address of the IP data packet having a destination address as the designated access address (such as 1.2.4.3) to the local IP address and the local port number.

The local IP address and the local port number may be preset or modified by the terminal. For example, the local IP address may be 127.0.0.1, and the local port number may be 8347, the specific content of which is not limited in the present embodiment of the present disclosure.

For example, when the terminal firewall detects that the destination address of the IP data packet that receives the access request is the designated access address 1.2.4.3, according to the address filtering rule configured for the firewall, the local IP address 127.0.0.1 and the local port number 8347 corresponding to the designated access address are acquired. The destination address of the IP data packet is converted from 1.2.4.3 to 127.0.0.1:8347. Afterwards, the IP data packet is sent. Since the converted destination address of the IP data packet points to the local webpage service, after the conversion of the destination address, the access request of the webpage may be successfully to the local webpage service.

In step 204, based on the interaction between the local web service and the operating system of the terminal, the access request is responded to and a response message is returned.

In some embodiments, after receiving the access request, the local webpage service resolves the access request, and determines that the access request is required to perform an interaction operation with the operating system of the terminal. The local webpage service performs the interaction operation, and feeds back the execution result as the response message.

The interaction operation may include reading an application list of the operating system of the terminal, reading local contact information, turning on the camera, turning on the microphone, and other operation that may be performed only based on the operating system of the terminal. The embodiment of the present disclosure does not limit the type of the interaction operation.

The local webpage service returns a corresponding execution result for different interaction operations. For example, when the interaction operation is reading an application list of the operating system, the execution result is returning a retrieved list of applications. When the interaction operation is turning on the camera, the execution result is turning on successfully or failure in turning on.

Returning a response message is sending the response message to the webpage.

In step 205, when the firewall detects that a source address of the response message is the local IP address and the local port number, the response message is redirected to the webpage.

In some embodiments, the process of redirecting the response message to the webpage includes: changing a source address of the response message to the designated access address according to an address filtering rule of the firewall; and forwarding the response message with the changed source address to the webpage. The initial source address of the response message is the local IP address and the local port number.

The response message sent by the local webpage service is in a form of an IP data packet, and the IP data packet of the response message also has to pass through the firewall. The firewall is configured with an address filtering rule for the local webpage service. For example, the address filtering rule may be: converting all source addresses of IP data packets having source addresses as the local IP address (such as 127.0.0.1) and the local port number (such as 8347) to the designated access address. The IP data packet with the converted source address is sent to the browse component. When the browse component detects that the source address of the IP data packet is the designated access address, determines that the IP data packet is a response message returned to the webpage, and forwards the IP data packet to the webpage, specifically to the script js of the webpage.

For example, when the firewall of the terminal detects that the source address of the IP data packet of the received response message is the local IP address and the local port number 127.0.0.1:8347, according to the address filtering rule configured for the firewall, the designated access address 1.2.4.3 corresponding to the local IP address 127.0.0.1 and the local port number 8427 is acquired. The source address of the IP data packet is converted from 127.0.0.1:8347 to 1.2.4.3. Afterwards, the IP data packet is sent. The source address of the response message after the source address conversion is the designated access address, and when the browser identifies that the source address is the designated access address, the browser determines that the response message is information that the webpage interacts with the operating system of the terminal, and then returns the response message successfully to the webpage. Thereby, it can realize the interaction between the webpage and the operating system of the terminal.

It should be noted that the designated access address mentioned above may also be replaced by a designated access address and a designated port number. The designated port number may be set or modified by the terminal. For example, the designated port number may be 80, 5678, etc., which is not limited by the embodiment of the present disclosure.

In the method provided by the embodiment of the present disclosure, when an access request sent by a web page to a preset domain name is received, the preset domain name is resolved into a designated access address that has not been occupied. The access request with a destination address being the designated access address is redirected by a firewall to a local web service which may interact with the operating system of the terminal. Then, the interaction with the operating system of the terminal is performed by the local web service. Such information interaction process can avoid the limitation of the interaction function between the browser or the browser kernel and the operating system, enable interaction between the developed function of the web page and the operation system through a generic browser or software based on the browser kernel, which can lower the developing cost and have a wide applicability.

In addition, by registering the preset domain name for the access request of the webpage that is required to perform interaction with the operating system, it can avoid the domain name resolution confusion caused by the domain name occupation. By setting the designated access address as a non-existent IP address, it can avoid failure in redirection caused by IP address conflict, and it can improve stability and accuracy in information interaction.

In addition, the firewall redirects the source address of the response message returned by the local webpage service, so that the returned response message can be successfully sent to the webpage, and the information transmission from the operating system to the webpage can be completed. In some embodiments, through the address filtering rule of the firewall, it can implement bidirectional address redirection of the IP data packet from the webpage to the local webpage service and from the local webpage service to the webpage, and by utilizing "disguised" destination address and source address, it can realize two-way communication between the webpage and the operating system.

Figure 3A:
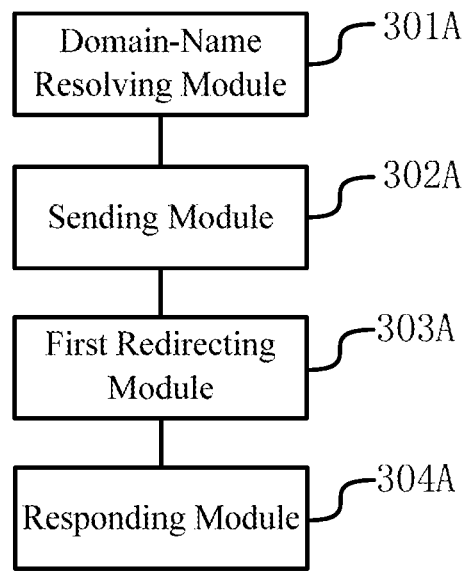
FIG. 3A is a block diagram of a device for information interaction according to some embodiments.

FIG. 3A is a block diagram of a device for information interaction according to some embodiments. As shown in FIG. 3A, the device includes a domain-name resolving module 301A, a sending module 302A, a first redirecting module 303A and a responding module 304A.

The various device components, units, blocks, or portions may have modular configurations, or are composed of discrete components, but nonetheless may be referred to as "modules" in general. In other words, the "components," "modules" or "units" referred to herein may or may not be in modular forms.

The domain-name resolving module 301A is connected to the sending module 302A, and configured to, when an access request sent by a webpage to a preset domain name is received by a browser component, resolve the preset domain name into a designated access address, the access request being sent by the webpage when the webpage is required to interact with an operating system of a terminal, and the designated access address being an access address that has not been occupied. The sending module 302A is connected to the first redirecting module 303A and configured to send the access request to the designated access address as the destination address. The first redirecting module 303A is connected to the responding module 304A and configured to, when a firewall detects that the destination address of the access request is the designated access address, redirect the access request to a local web service, the local web service being configured for information interaction with the operating system of the terminal. The responding module 304A is configured to, based on the interaction between the local web service and the operating system of the terminal, respond to the access request and return a response message.

In some embodiments, the domain-name resolving module is configured to invoke a domain name resolution interface of the operating system of the terminal by the browser component, the domain name resolution interface having a domain name filtering function; and resolve the preset domain name into the designated access address based on the domain name filtering function.

In some embodiments, the first redirecting module is configured to convert the destination address of the access request into a local IP address and a local port number according to an address filtering rule of the firewall, the local IP address and the local port number pointing to the local webpage service; and forward the access request with the converted destination address to the local webpage service.

In some embodiments, the device further includes:
a second redirecting module configured to, when the firewall detects that a source address of the response message is the local IP address and the local port number, redirect the response message to the webpage;
wherein both of the local IP address and the local port number point to the local web service.

In some embodiments, the second redirecting module is configured to change the source address of the response message to the designated access address according to the address filtering rule of the firewall; and forward the response message with the changed source address to the webpage.

In the device provided by the embodiment of the present disclosure, when an access request sent by a webpage to a preset domain name is received, the preset domain name is resolved into a designated access address that has not been occupied. The access request with a destination address being the designated access address is redirected by a firewall to a local web service which may interact with the operating system of the terminal. Then, the interaction with the operating system of the terminal is performed by the local web service. Such information interaction process can avoid the limitation of the interaction function between the browser or the browser kernel and the operating system, enable interaction between the developed function of the webpage and the operation system through a generic browser or software based on the browser kernel, which can lower the developing cost and have a wide applicability.

With regard to the device in the above embodiments, the specific manner in which the respective modules perform the operations has been described in detail in the embodiment relating to the method, and will not be explained in detail herein.

Figure 3B:
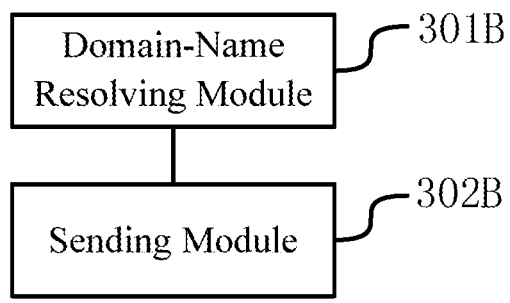
FIG. 3B is a block diagram of a device for information interaction according to some embodiments.

FIG. 3B is a block diagram of a device for information interaction according to some embodiments. As shown in FIG. 3B, the device includes a domain-name resolving module 301B and a sending module 302B.

The domain-name resolving module 301B is connected to the sending module 302B, and configured to, when receiving an access request sent by a webpage to a preset domain name, resolve the preset domain name into a designated access address, the access request being sent by the webpage when the webpage is required to interact with an operating system of a terminal, and the designated access address being an access address that has not been occupied. The sending module 302B is configured to send the access request to the designated access address as the destination address, wherein the access request is subject to address filtering detection by a firewall, and the firewall is configured to: when the firewall detects that the destination address of the access request is the designated access address, redirect the access request to a local web service for information interaction with the operating system of the terminal, respond to the access request and return a response message.

In some embodiments, the domain-name resolving module is configured to invoke a domain name resolution interface of the operating system of the terminal, the domain name resolution interface having a domain name filtering function; and resolve the preset domain name into the designated access address based on the domain name filtering function.

In the device provided by the embodiment of the present disclosure, when an access request sent by a webpage to a preset domain name is received, the preset domain name is resolved into a designated access address that has not been occupied. The designated access address may be redirected by a firewall to a local web service that may interact with the operating system of the terminal. Then, the interaction with the operating system of the terminal is performed by the local web service, and a response message is returned. Such information interaction process can avoid the limitation of the interaction function between the browser or the browser kernel and the operating system, enable interaction between the developed function of the webpage and the operation system through a generic browser or software based on the browser kernel, which can lower the developing cost and have a wide applicability.

Figure 4:
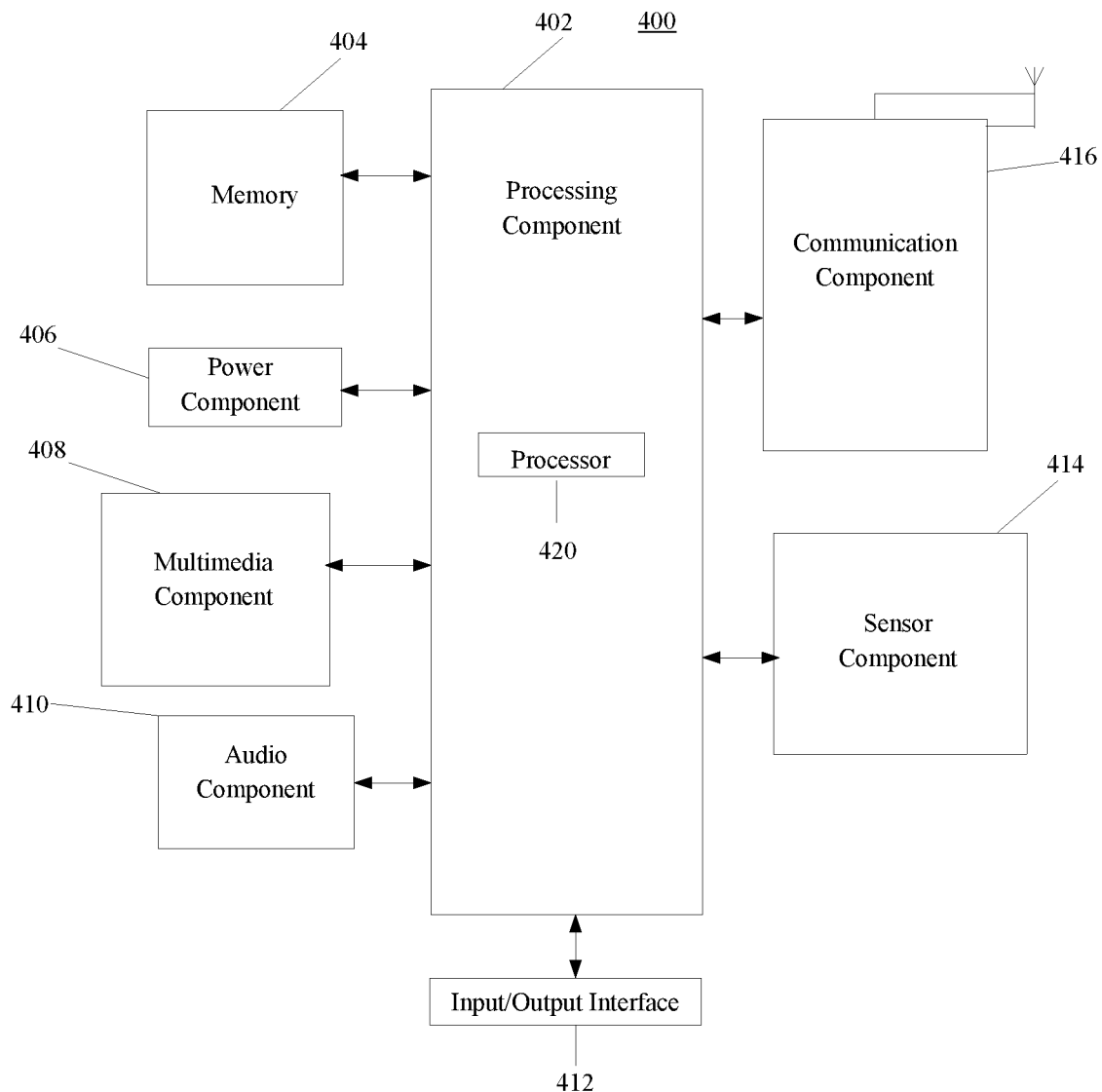
FIG. 4 is a block diagram of a device 400 for information interaction according to some embodiments.

FIG. 4 is a block diagram of a device 400 for information interaction according to some embodiments. For example, the device 400 may be a mobile phone, a computer, a digital broadcast terminal, a messaging device, a gaming console, a tablet, a medical device, exercise equipment, a personal digital assistant, and the like.

As shown in FIG. 4, the device 400 may include one or more of the following components: a processing component 402, a memory 404, a power component 406, a multimedia component 408, an audio component 410, an input/output (I/O) interface 412, a sensor component 414, and a communication component 416.

The processing component 402 typically controls overall operations of the device 400, such as the operations associated with display, telephone calls, data communications, camera operations, and recording operations. The processing component 402 may include one or more processors 420 to execute instructions, to perform all or part of the steps of the above method. Moreover, the processing component 402 may include one or more modules which facilitate the interaction between the processing component 402 and other components. For instance, the processing component 402 may include a multimedia module to facilitate the interaction between the multimedia component 408 and the processing component 402.

The memory 404 is configured to store various types of data to support the operation of the device 400. Examples of such data include instructions for any applications or methods operated on the device 400, contact data, phonebook data, messages, pictures, video, etc. The memory 404 may be implemented using any type of volatile or non-volatile memory devices, or a combination thereof, such as a static random-access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 406 provides power to various components of the device 400. The power component 406 may include a power management system, one or more power sources, and any other components associated with the generation, management, and distribution of power in the device 400.

The multimedia component 408 includes a screen providing an output interface between the device 400 and the user. In some embodiments, the screen may include a liquid crystal display (LCD), a light-emitting diode (LED) display, an organic LED (OLED) display, and a touch panel (TP). The screen can display the content of a webpage to a user, for example.

If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 408 includes a front camera and/or a rear camera. The front camera and the rear camera may receive an external multimedia datum while the device 400 is in an operation mode, such as a photographing mode or a video mode. Each of the front camera and the rear camera may be a fixed optical lens system or have focus and optical zoom capability.

The audio component 410 is configured to output and/or input audio signals. For example, the audio component 410 includes a microphone ("MIC") configured to receive an external audio signal when the device 400 is in an operation mode, such as a call mode, a recording mode, and a voice recognition mode. The received audio signal may be further stored in the memory 404 or transmitted via the communication component 416. In some embodiments, the audio component 410 further includes a speaker to output audio signals.

The I/O interface 412 provides an interface between the processing component 402 and peripheral interface modules, such as a keyboard, a click wheel, buttons, and the like.

The buttons may include, but are not limited to, a home button, a volume button, a starting button, and a locking button.

The sensor component 414 includes one or more sensors to provide status assessments of various aspects of the device 400. For instance, the sensor component 414 may detect an open/closed status of the device 400, relative positioning of components, e.g., the display and the keypad, of the device 400, a change in position of the device 400 or a component of the device 400, a presence or absence of user contact with the device 400, an orientation or an acceleration/deceleration of the device 400, and a change in temperature of the device 400. The sensor component 414 may include a proximity sensor configured to detect the presence of nearby objects without any physical contact. The sensor component 414 may also include a light sensor, such as a CMOS or CCD image sensor, for use in imaging applications. In some embodiments, the sensor component 414 may also include an accelerometer sensor, a gyroscope sensor, a magnetic sensor, a pressure sensor, or a temperature sensor.

The communication component 416 is configured to facilitate communication, wired or wirelessly, between the device 400 and other devices. The device 400 can access a wireless network based on a communication standard, such as WiFi, 2G, or 3G, or a combination thereof. In one exemplary embodiment, the communication component 416 receives a broadcast signal or broadcast associated information from an external broadcast management system via a broadcast channel. In some embodiments, the communication component 416 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In some embodiments, the device 400 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, to perform the above method for information interaction.

In another aspect, a mobile terminal is provided including the device described above, and further including a microphone and a speaker.

In some embodiments, the mobile terminal is a mobile phone.

In some embodiments, the processor is a general-purpose processor, such as central processing unit (CPU) of the mobile phone, which is configured to not only realize the methods described above but also run programs or applications (Apps) on the mobile phone, such as browsing, gaming, video/textual/voice communications, etc.

In some other embodiments, the processor is an ASIC described above.

In some embodiments, there is also provided a non-transitory computer-readable storage medium including instructions, such as included in the memory 404, executable by the processor 420 in the device 400 to perform the above method. For example, the non-transitory computer-readable storage medium may be a ROM, a RAM, a CD-ROM, a magnetic tape, a floppy disc, an optical data storage device, and the like.

In some embodiments, there is also provided a computer readable storage medium, instructions are stored in the storage medium, and when the instructions in the storage medium are executed by a processor of the terminal, the terminal is caused to perform the above method for information interaction.

At least some of the embodiments of the present disclosure can have one or more of the following advantages: when an access request sent by a webpage to a preset domain name is received, the preset domain name is resolved into a designated access address that has not been occupied. The access request with a destination address being the designated access address is redirected by a firewall to a local web service which may interact with the operating system of the terminal. Then, the interaction with the operating system of the terminal is performed by the local web service. Such information interaction process can avoid the limitation of the interaction function between the browser or the browser kernel and the operating system, enable interaction between the developed function of the webpage and the operation system through a generic browser or software based on the browser kernel, which can lower the developing cost and have a wide applicability.

In the present disclosure, it is to be understood that the terms "lower," "upper," "center," "longitudinal," "transverse," "length," "width," "thickness," "upper," "lower," "front," "back," "left," "right," "vertical," "horizontal," "top," "bottom," "inside," "outside," "clockwise," "counter-clockwise," "axial," "radial," "circumferential," "column," "row," and other orientation or positional relationships are based on example orientations illustrated in the drawings, and are merely for the convenience of the description of some embodiments, rather than indicating or implying the device or component being constructed and operated in a particular orientation. Therefore, these terms are not to be construed as limiting the scope of the present disclosure.

Moreover, the terms "first" and "second" are used for descriptive purposes only and are not to be construed as indicating or implying a relative importance or implicitly indicating the number of technical features indicated. Thus, elements referred to as "first" and "second" may include one or more of the features either explicitly or implicitly. In the description of the present disclosure, "a plurality" indicates two or more unless specifically defined otherwise.

In the present disclosure, the terms "installed," "connected," "coupled," "fixed" and the like shall be understood broadly, and may be either a fixed connection or a detachable connection, or integrated, unless otherwise explicitly defined. These terms can refer to mechanical or electrical connections, or both. Such connections can be direct connections or indirect connections through an intermediate medium. These terms can also refer to the internal connections or the interactions between elements. The specific meanings of the above terms in the present disclosure can be understood by those of ordinary skill in the art on a case-by-case basis.

In the present disclosure, a first element being "on," "over," or "below" a second element may indicate direct contact between the first and second elements, without contact, or indirect through an intermediate medium, unless otherwise explicitly stated and defined.

Moreover, a first element being "above," "over," or "at an upper surface of" a second element may indicate that the first element is directly above the second element, or merely that the first element is at a level higher than the second element. The first element "below," "underneath," or "at a lower surface of" the second element may indicate that the first element is directly below the second element, or merely that the first element is at a level lower than the second feature. The first and second elements may or may not be in contact with each other.

In the description of the present disclosure, the terms "one embodiment," "some embodiments," "example," "specific example," or "some examples," and the like may indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described may be combined in a suitable manner in any one or more embodiments or examples. In addition, various embodiments or examples described in the specification, as well as features of various embodiments or examples, may be combined and reorganized.

In some embodiments, the control and/or interface software or app can be provided in a form of a non-transitory computer-readable storage medium having instructions stored thereon is further provided. For example, the non-transitory computer-readable storage medium may be a Read-Only Memory (ROM), a Random-Access Memory (RAM), a Compact Disc Read-Only Memory (CD-ROM), a magnetic tape, a floppy disk, optical data storage equipment, a flash drive such as a USB drive or an SD card, and the like.

Implementations of the subject matter and the operations described in this disclosure can be implemented in digital electronic circuitry, or in computer software, firmware, or hardware, including the structures disclosed herein and their structural equivalents, or in combinations of one or more of them. Implementations of the subject matter described in this disclosure can be implemented as one or more computer programs, i.e., one or more modules of computer program instructions, encoded on one or more computer storage medium for execution by, or to control the operation of, data processing apparatus.

Alternatively, or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them.

Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, drives, or other storage devices). Accordingly, the computer storage medium may be tangible.

The operations described in this disclosure can be implemented as operations performed by a data processing apparatus on data stored on one or more computer-readable storage devices or received from other sources.

The devices in this disclosure can include special purpose logic circuitry, e.g., an FPGA (field-programmable gate array), or an ASIC (application-specific integrated circuit). The device can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The devices and execution environment can realize various different computing model infrastructures, such as web services, distributed computing, and grid computing infrastructures. For example, the devices can be controlled remotely through the Internet, on a smart phone, a tablet computer or other types of computers, with a web-based graphic user interface (GUI).

A computer program (also known as a program, software, software application, app, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform actions by operating on input data and generating output. The processes and logic flows can also be performed by, and apparatus can also be implemented as, special purpose logic circuitry, e.g., an FPGA, or an ASIC.

Processors suitable for the execution of a computer program include, by way of example, both general and special purpose microprocessors, and any one or more processors of any kind of digital computer. Generally, a processor will receive instructions and data from a read-only memory, or a random-access memory, or both. Elements of a computer can include a processor configured to perform actions in accordance with instructions and one or more memory devices for storing instructions and data.

Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented with a computer and/or a display device, e.g., a VR/AR device, a head-mount display (HMD) device, a head-up display (HUD) device, smart eyewear (e.g., glasses), a CRT (cathode-ray tube), LCD (liquid-crystal display), OLED (organic light emitting diode), TFT (thin-film transistor), plasma, other flexible configuration, or any other monitor for displaying information to the user and a keyboard, a pointing device, e.g., a mouse, trackball, etc., or a touch screen, touch pad, etc., by which the user can provide input to the computer.

Other types of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The features disclosed herein may be implemented as part of a smart home or a smart office design, which may implement individually or integrally various electronic devices in a home or office. For example, control or display functions described above may be realized on a smart television (or connected television, hybrid television, etc.), which may include a processing circuit configured to integrate Internet connectivity with more traditional television programming sources (e.g., received via cable, satellite, over-the-air, or other signals). The smart television may be physically incorporated into a television set or may include a separate device such as a set-top box, Blu-ray or other digital media player, game console, hotel television system, and other companion devices. A smart television may be configured to allow viewers to search and find videos, movies, photos and other content on the web, on a local cable TV channel, on a satellite TV channel, or stored on a local hard drive.

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination.

Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing may be utilized.

It is intended that the specification and embodiments be considered as examples only. Other embodiments of the disclosure will be apparent to those skilled in the art in view of the specification and drawings of the present disclosure. That is, although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the example embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

The invention claimed is:

1. A method for information interaction, comprising:
    when an access request sent by a webpage to a preset domain name is received by a browser component, resolving the preset domain name into a designated access address, the access request being sent by the webpage when the webpage is required to interact with an operating system of a terminal, and the designated access address being an access address that has not been occupied;
    sending the access request to the designated access address as a destination address;
    when a firewall detects that the destination address of the access request is the designated access address, redirecting the access request to a local web service, the local web service being configured for information interaction with the operating system of the terminal;
    responding to the access request and returning a response message based on the information interaction between the local web service and the operating system of the terminal; and
    when the firewall detects that a source address of the response message is a local IP address and a local port number, redirecting the response message to the webpage,
    wherein both of the local IP address and the local port number point to the local web service.

2. The method according to claim 1, wherein said resolving the preset domain name into the designated access address comprises:
    invoking a domain name resolution interface of the operating system of the terminal by the browser component, the domain name resolution interface having a domain name filtering function; and resolving the preset domain name into the designated access address based on the domain name filtering function.

3. The method according to claim 1, wherein said redirecting the access request to the local web service comprises:
converting the destination address of the access request into the local IP address and the local port number according to an address filtering rule of the firewall, wherein both of the local IP address and the local port number point to the local web service; and
forwarding the access request with the converted destination address to the local web service.

4. The method according to claim 1, wherein said redirecting the response message to the webpage comprises:
changing the source address of the response message to the designated access address according to an address filtering rule of the firewall; and
forwarding the response message with the changed source address to the webpage.

5. A device for information interaction, comprising:
a processor; and
memory for storing instructions executable by the processor,
wherein the processor is configured to perform the method according to claim 1.

6. The device according to claim 5, wherein the processor is further configured to invoke a domain name resolution interface of the operating system of the terminal by the browser component, the domain name resolution interface having a domain name filtering function; and resolve the preset domain name into the designated access address based on the domain name filtering function.

7. The device according to claim 5, wherein the processor is further configured to convert the destination address of the access request into the local IP address and the local port number according to an address filtering rule of the firewall, the local IP address and the local port number pointing to the local web service; and forward the access request with the converted destination address to the local web service.

8. The device according to claim 5, wherein the processor is further configured to change the source address of the response message to the designated access address according to an address filtering rule of the firewall; and forward the response message with the changed source address to the webpage.

9. A method for information interaction, which is applied in a browser component, the method comprising:
when receiving an access request sent by a webpage to a preset domain name, resolving the preset domain name into a designated access address, the access request being sent by the webpage when the webpage is required to interact with an operating system of a terminal, and the designated access address being an access address that has not been occupied;
sending the access request with the designated access address as a destination address, wherein the access request is subject to address filtering detection by a firewall, and the firewall is configured to: when the firewall detects that the destination address of the access request is the designated access address, redirect the access request to a local web service for information interaction with the operating system of the terminal, respond to the access request and return a response message; and when the firewall detects that a source address of the response message is a local IP address and a local port number, redirecting the response message to the webpage,
wherein both of the local IP address and the local port number point to the local web service.

10. The method according to claim 9, wherein said resolving the preset domain name into the designated access address comprises:
invoking a domain name resolution interface of the operating system of the terminal, the domain name resolution interface having a domain name filtering function; and
resolving the preset domain name into the designated access address based on the domain name filtering function.

11. A device for information interaction, comprising:
a processor; and
memory for storing instructions executable by the processor,
wherein the processor is configured to perform the method according to claim 9.

12. The device according to claim 11, wherein the processor is further configured to:
invoke a domain name resolution interface of the operating system of the terminal, the domain name resolution interface having a domain name filtering function; and
resolve the preset domain name into the designated access address based on the domain name filtering function.

13. A mobile terminal comprising the device according to claim 11, further comprising a microphone and a speaker.

14. The mobile terminal according to claim 13, wherein the mobile terminal is a mobile phone, and the processor is a central processing unit (CPU) of the mobile phone.

15. A non-transitory computer-readable storage medium having stored thereon instructions that, when being executed by a processor, cause the processor to:
when receiving an access request sent by a webpage to a preset domain name, resolve the preset domain name into a designated access address, the access request being sent by the webpage when the webpage is required to interact with an operating system of a terminal, and the designated access address being an access address that has not been occupied; and send the access request with the designated access address as a destination address, wherein the access request is subject to address filtering detection by a firewall, and the firewall is configured to: when the firewall detects that the destination address of the access request is the designated access address, redirect the access request to a local web service for information interaction with the operating system of the terminal, respond to the access request, and return a response message; and
when the firewall detects that a source address of the response message is a local IP address and a local port number, redirect the response message to the webpage,
wherein both of the local IP address and the local port number point to the local web service.

16. The non-transitory computer-readable storage medium according to claim 15, wherein the processor is further configured to:
invoke a domain name resolution interface of the operating system of the terminal, the domain name resolution interface having a domain name filtering function; and resolve the preset domain name into the designated access address based on the domain name filtering function.

\* \* \* \* \*